Figure 1:
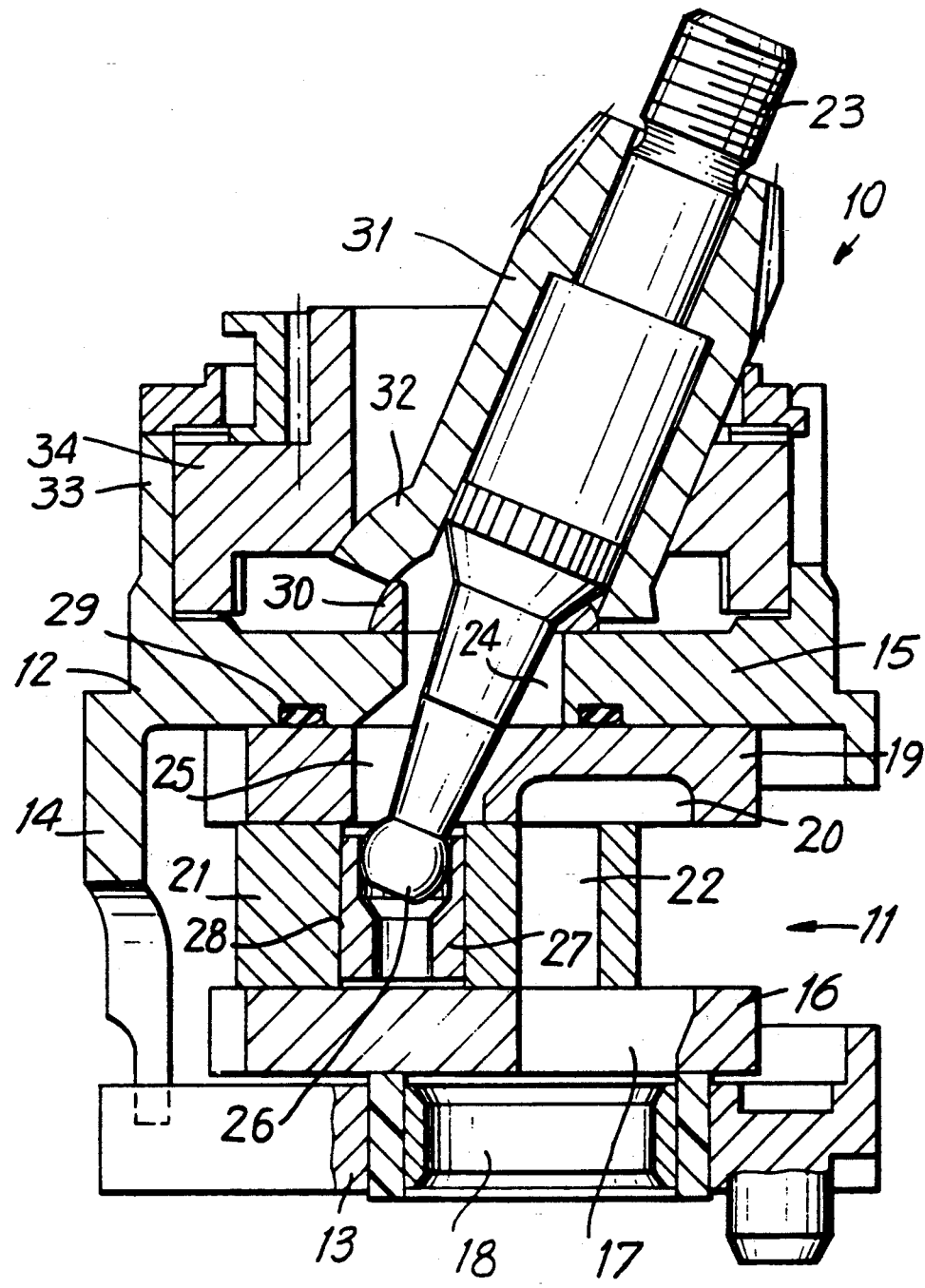

United States Patent [19]

Bergmann

[11] Patent Number: 5,144,981
[45] Date of Patent: Sep. 8, 1992

[54] SANITARY WATER VALVE WITH ACTUATING MECHANISM

[75] Inventor: Konrad Bergmann, Wittlich, Fed. Rep. of Germany

[73] Assignee: American Standard Inc., New York, N.Y.

[21] Appl. No.: 679,041
[22] PCT Filed: Nov. 16, 1989
[86] PCT No.: PCT/DE89/00719
   § 371 Date: May 14, 1991
   § 102(e) Date: May 14, 1991
[87] PCT Pub. No.: WO90/05868
   PCT Pub. Date: May 31, 1990

[30] Foreign Application Priority Data
Nov. 16, 1988 [DE] Fed. Rep. of Germany ....... 3838765

[51] Int. Cl.⁵ ............................................. F16K 11/06
[52] U.S. Cl. .............................. 137/625.4; 137/625.17; 137/636.2; 251/235
[58] Field of Search .......... 137/625.17, 625.4, 625.41, 137/636.3, 454.5, 454.6, 636.2; 251/235

[56] References Cited

U.S. PATENT DOCUMENTS

| | | | |
|---|---|---|---|
| 3,324,884 | 6/1967 | Dornaus | 137/625.17 |
| 3,415,281 | 12/1968 | Perlman | 137/625.4 |
| 3,526,250 | 9/1970 | Miller | 137/625.4 |
| 3,667,503 | 6/1972 | Farrell et al. | 137/625.4 |
| 3,882,897 | 5/1975 | Manoogian et al. | 137/625.4 |
| 4,163,460 | 8/1979 | Zucchetti | 137/636.3 |
| 4,378,029 | 3/1983 | Parkison | 137/636.3 |
| 4,697,620 | 10/1987 | Bergmann | 137/625.17 |
| 4,770,208 | 9/1988 | Stella | 137/625.17 |
| 4,887,642 | 12/1989 | Bernat | 137/625.17 |

FOREIGN PATENT DOCUMENTS 3419208 11/1985 Fed. Rep. of Germany .
3525053 1/1987 Fed. Rep. of Germany .

Primary Examiner—George L. Walton
Attorney, Agent, or Firm—Blum Kaplan

[57] ABSTRACT

In a sanitary water valve having a control member which consists of three disk cams arranged above one another and which is enclosed by a casing, whereby the lower and the upper disk cam are stationary and the middle disk cam is moveable relative to the stationery disk cams by an actuator which engages in it, whereby the actuator, which is arranged in two planes to tilt and to swivel, passes through the casing lid and the upper stationery disk cam, the bearing of the actuator is to be improved. To this end, the actuator 23 is seated on bearings (30) which are arranged on casing 12, which encloses the control member 11, in such a manner that the fulcrum of the actuator (23) is situated in the plane of the casing lid (15).

11 Claims, 2 Drawing Sheets

SANITARY WATER VALVE WITH ACTUATING MECHANISM

The invention relates to a sanitary water valve with a control member, which consists of three disk cams situated above one another and which is enclosed by a casing, whereby the lower and the upper disk cam are stationery and the middle disk cam is displaceable relative to the stationery disk cams by an actuator that engages in it, whereby the actuator, which is arranged in two planes within the casing to tilt and to swivel, respectively, passes through the casing lid and the upper stationery disk cam.

A water valve having generic characteristics of this type is described in DE-OS 35 25 053.4; this water valve is characterized in particular by a control member consisting of three disks, whereby the middle disk is a moveable disk cam that is displaceable relative to the two outer stationery disks. The displacement of the middle disk cam and thus the regulation of the water flow are performed by an actuator, which engages in the middle disk cam and which is connected to it, to which end it passes through the lid of the casing that encloses the control member as well as through the upper stationery disk cam via a correspondingly arranged opening. In the known water valve, the actuator is supported by a spheroidal widening which is formed on it and which is situated in the opening of the upper stationery disk cam.

This results in the disadvantage that due to the cramped dimensions of the upper stationery disk cam only a very small radius can be formed for the bearing ball that is to be accepted by the upper disk cam. In the series production of larger quantities of water valves, however, it is almost impossible to adhere to the resulting narrow manufacturing tolerances. In addition, when the ball radius is small, the bearing surfaces that are available for the actuator in the upper disk are so narrowly dimensioned that sufficient stability of the bearing of the actuator in the upper disk as well as of the guidance of the middle moveable disk via the actuator can hardly be achieved.

In order to avoid such disadvantages, it is known from DE-OS 34 19 208, for example, in the case of a gasket which encompasses two disks, in which the actuator engages in the upper moveable disk, that the actuator is to be borne with a bearing ball having a comparably large diameter in the lid part of the casing which, accordingly, is thickly constructed. Such a solution, however, cannot be applied to a water valve according to this generic type because, due to the additional third disk cam and to a correspondingly thick construction of the casing lid to facilitate the acceptance of a bearing ball with a larger diameter, the construction height of the valve would overall exceed the beneficial scale.

It is therefore the objective of the invention to improve a water valve having the characteristics of this generic type in such a manner that its construction height is limited while, at the same time, facilitating an easily manufactured and effectively functioning bearing of the actuator.

The realization of this objective including advantageous embodiments and additional developments results from the contents of the patent claims preceding this description.

The invention starts out from the basic idea that the actuator is supported on bearings arranged on the outside of the casing, which encloses the control member, in such a manner that the fulcrum of the actuator is situated in the plane of the casing lid. This leads to considerable advantage that, on the one hand, the lid of the casing which encloses the control member can be kept relatively thin, because it must not fulfill a bearing function, only a passage function for the actuator; on the other hand, this advantageously entails a short distance between the fulcrum of the actuator, which is arranged in the plane of the casing lid, and its connection to the moveable disk. As a consequence, due to the short lever arm thus constructed between the fulcrum and the point of engagement at the middle disk as well as to the longer lever arm between the fulcrum and the handle, which is formed at the upper end of the actuator, a larger rotating motion of the hand lever entails only a comparably minor displacement of the moveable disk, therefore permitting precision adjustment of the waterways. With regard to the valve of this generic type, this point is of great importance because, due to the possibility of water outlets in two planes the water passage through the valve is much larger than in a two-disk valve, so that even minor displacements of the moveable disk cam have comparably large effects on the amount of water overall that passes through the valve.

According to a preferred embodiment, bearings having the shape of spheroidal sections are arranged to rise on the casing lid; they are enclosed by a form-locking sleeve, which is connected to the actuator, in such a manner that a seating of the actuator via the sleeve, which is formed on it, is achieved in interaction with the bearings arranged on the casing lid. According to an embodiment of the invention, these bearings are formed as a semicylindrical body, whose intersecting plane rests on the casing lid perpendicular to the swiveling plane of the actuator and which exhibits an opening for the passage of the actuator; analogous hereto, the sleeve exhibits lugs that overlap the semicylinder so that here a slide bearing is achieved on a cylinder section.

According to an embodiment of the invention, in the plane of the casing lid the actuator exhibits a spheroidal thickening which fills out the passage opening in the casing lid, thus enabling additional guidance and stability of the actuator against tensile load; this spheroidal thickening, however, does not perform any bearing functions for the actuator.

According to the invention, provision can also be made to secure the actuator with sleeve by a carrier part which must be clamped to the casing, so that the actuator with sleeve is locked in position relative to the bearings.

The drawing shows two embodiments of the invention that are described in the following.

Figure 2:
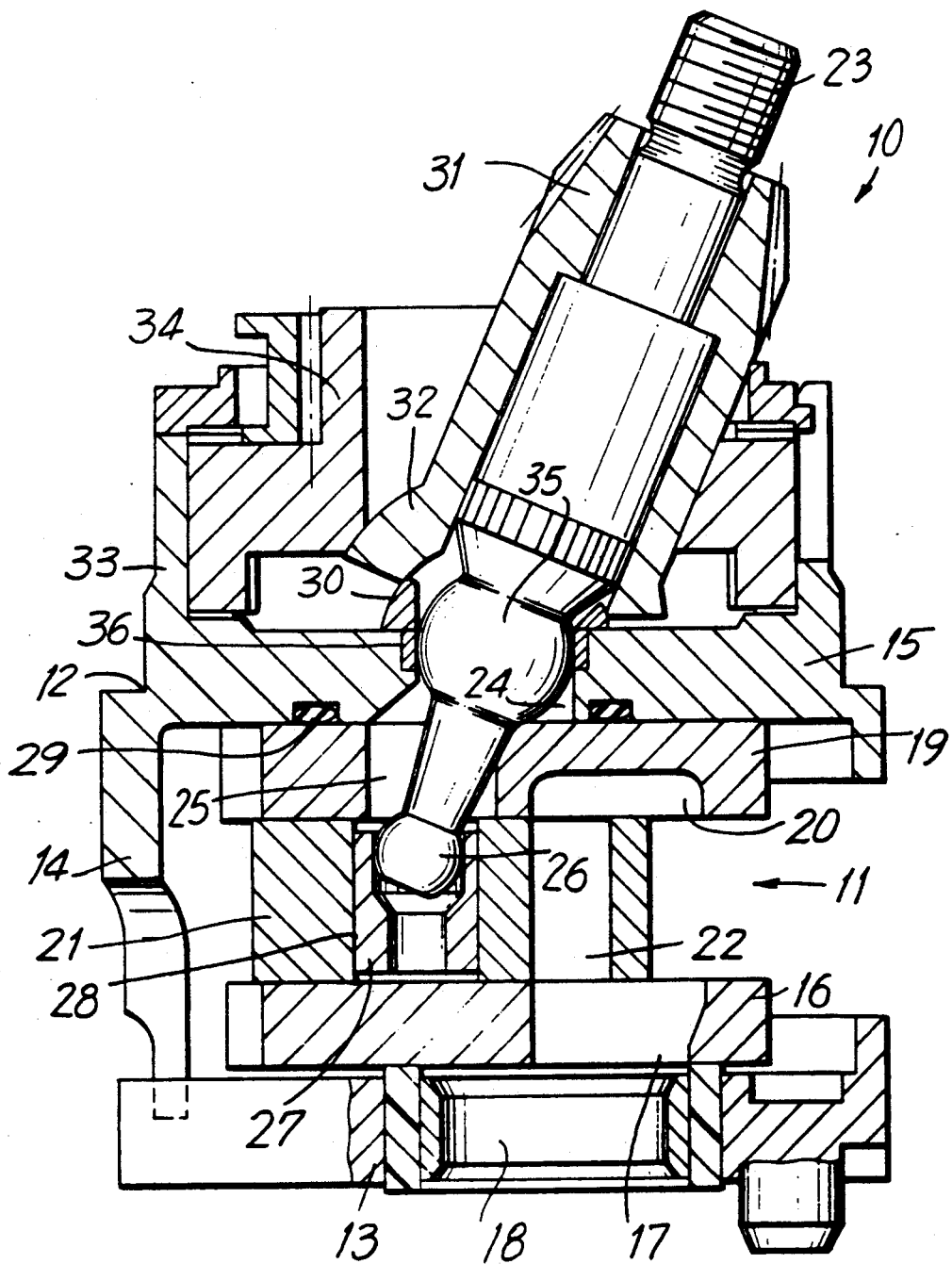

FIG. 1 shows a section of a sanitary water valve;
FIG. 2 shows another embodiment of the water valve according to FIG. 1.

The water valve 10 exhibits as its control member 11 a disk package consisting of three individual disks, which is enclosed by a casing 12 with a floor 13, a side wall 14, and a lid 15. The lower disk 16 of the control element 11 is locked into position against the casing floor 12 and exhibits openings 17 for the passage of the cold and hot water, which flows into the valve through corresponding passage openings 18 in the casing floor 13; only one opening 17, 18 each is visible in the figures.

Locked into position against the upper casing lid 15 is the upper disk 19 of the control element 11, which exhibits diversion chambers 20 that are associated with the openings 17, 18. As results from the figure, the moveable disk 21 with correspondingly communicating openings 22 is arranged between the stationery disks 16, 19. In each figure, the valve is drawn in its open position, whereby the right edge of the moveable disk is displaced relative to the corresponding edges of the stationery disks 16, 19, so that the water that enters into the water valve 10 from below can flow into the water chamber of the valve via the openings 17 and 22, respectively, and the diversion chamber 20. When the moveable disk 21 is displaced to the right until the disk edges achieve congruence, the closed position of the water valve has been accomplished, in which the diversion chambers 20 are consistently under the pressure of the water pressing against the valve.

An actuator 23 is intended for the movement and the displacement of the moveable disk 21; it passes through the casing lid 15 via an opening 24 and through the upper stationery disk 19 via a corresponding opening 25 and which engages in the moveable disk 21 with a spheroidal guide 26, the disk 21 having a bore for this purpose, into which is inserted a sleeve 27 for the acceptance of the spheroidal guide 26 of the actuator 23. The actuator 23 is basically rod-shaped and has a small diameter in the area of the passage openings 24, 25 in the stationery upper disk 19 and in the casing lid 15, respectively, and a larger diameter in the area located outside of the casing 12. The upper disk 19 is additionally sealed against the underside of the casing lid 15 by a gasket 29 which encloses the respective passage opening 25, so that no water can emerge from the water chamber of the valve through the joint face between the control element 11 and the underside of the casing lid 15 through the opening 24 of the casing 12.

To bear the actuator 23, bearings 30 are formed to rise on the upper side of the lid 15 which exhibit the shape of spheroidal sections in the cross-sectional representation in the Figures. In the plane of reference of the valve that is perpendicular to the movement plane of the actuator 23 resulting from the sectional representation, it is a semicylinder, whose intersecting plane rests on the lid 15 and which exhibits an opening for the passage of the actuator 23.

The spheroidal sections 30 that rise in the shape of a dome are overlapped by lugs 32 of a sleeve 31 which, in turn, is connected to the actuator 23; the respective lugs 32 hereby exhibit an internal surface that is adapted to the external shape of the bearings 30.

The side walls 14 of the casing 12 are extended upward beyond the lid 15, resulting in a dish-shaped space that encloses the actuator 23 with sleeve 31, in which a carrier or insert portion 34 is locked into position by a suitable connection which, in turn, overlaps the lugs 32 of the sleeve 31 and therefore axially locks the actuator 23 with sleeve 31 into position within the valve.

FIG. 2 shows an embodiment, which in its representation corresponds to the embodiment previously described. In this embodiment, however, in the plane of the casing lid 15 the actuator 23 exhibits a spheroidal thickening 35, which fills out the passage opening 24; through it the guiding of the actuator is improved and an additional axial stability against an axial displacement of the actuator 23 is accomplished. In interaction with this, an additional gasket 36, which encloses the spheroidal thickening 35 of the actuator 23, is inserted in the internal wall of the clearance 24.

The characteristics of the object of these documents as revealed in the above description, in the patent claims, in the summary, and in the drawing can be essential, individually or in any combination thereof, for the achievement of the invention in its various embodiments.

I claim:

1. A sanitary water valve comprising a casing having an insert portion, said insert portion having an inner surface, an outer surface and an opening therethrough, a control element supported in said casing below said insert portion, said control element including a lower stationary disk, an upper stationary disk spaced from said lower disk positioned proximate the inner surface of said insert portion, said upper stationary disk including a throughhole therethrough, and a control disk disposed intermediate said lower and upper disks and slidable with respect thereto, elongated actuator means having a first end coupled to said control disk and extending through said throughhole in said upper stationary disk and out of said casing through the opening in said insert portion for displacing said control disk laterally between said lower and upper disks upon actuation of said actuator means, said actuator means selectively tilting and swiveling with respect to said casing upon actuation thereof, said actuator means including first bearing means thereon, said casing having an intermediate portion with a coaxial opening adjacent said upper disk for passage of said actuator means therethrough and having an upstanding arcuately shaped second bearing means positioned thereon, and a third bearing means on said insert portion spaced from said second bearing means, said first bearing means of said actuation means having an extending portion defining opposed arcuate bearing surfaces on opposite sides thereof which ride intermediate said second and third bearing means, said actuator means defining a fulcrum disposed along said coaxial opening and said through hole of said upper disk and being positioned below said first, second and third bearing means.

2. The sanitary water valve as claimed in claim 1, wherein said second bearing means includes a bearing surface extending upwardly from the outer surface of said intermediate portion.

3. The sanitary water valve as claimed in claim 1, wherein said second bearing means includes at least one dome-shaped bearing.

4. The sanitary water valve as claimed in claim 3, wherein said dome-shaped bearing is partially spherical in section.

5. The sanitary water valve as claimed in claim 4, wherein said dome-shaped bearing is semicircular in shape and includes an opening for the passage of said actuator means therethrough.

6. The sanitary water valve as claimed in claim 1, wherein said first bearing means includes a sleeve supported on said actuator means, said sleeve engaging said second bearing means.

7. The sanitary water valve as claimed in claim 6, wherein said sleeve includes an enlarged section into which said second bearing means extends.

8. The santiary water valve as claimed in claim 7, wherein the inner surface of said enlarged section corresponds essentially to the shape of said second bearing means.

9. The sanitary water valve as claimed in claim 1, wherein said casing includes a carrier section above said intermediate portion for locking said sleeve to said second bearing means.

10. The sanitary water valve as claimed in claim 1, wherein said actuator means includes a spherical portion positioned in the opening of said intermediate portion essentially in the plane defined by said intermediate portion.

11. The sanitary water valve as claimed in claim 1, wherein said control element further includes a gasket for sealing said upper disk against the inner surface of intermediate portion said.

* * * * *